United States Patent
Basson et al.

(10) Patent No.: US 8,711,779 B2
(45) Date of Patent: *Apr. 29, 2014

(54) WIRELESS COMMUNICATION SYSTEM, ASSOCIATED METHODS AND DATA STRUCTURES

(75) Inventors: Gal Basson, Haifa (IL); Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,768

(22) Filed: Jun. 28, 2012

(65) Prior Publication Data

US 2012/0263116 A1    Oct. 18, 2012

Related U.S. Application Data (63) Continuation of application No. 11/645,789, filed on Dec. 27, 2006, now Pat. No. 8,243,749, which is a continuation-in-part of application No. 11/292,909, filed on Dec. 1, 2005, now Pat. No. 8,200,164.

(51) Int. Cl.
    *H04W 4/00*     (2009.01)
    *H04L 12/26*    (2006.01)
    *H04J 3/16*     (2006.01)
    *H04B 1/38*     (2006.01)
    *H04M 1/00*     (2006.01)

(52) U.S. Cl.
     USPC .......... 370/328; 370/334; 370/338; 370/252; 370/465; 455/73; 455/562.1

(58) Field of Classification Search
     USPC .......................................... 370/328
     See application file for complete search history.

(56) References Cited

U.S. PATENT DOCUMENTS

| | | | |
|---|---|---|---|
| 5,862,132 A | 1/1999 | Blanchard et al. | |
| 5,912,887 A | 6/1999 | Sehgal | |

(Continued)

FOREIGN PATENT DOCUMENTS

| | | |
|---|---|---|
| JP | 2005-198213 | 7/2005 |
| WO | 03/049353 | 6/2003 |

OTHER PUBLICATIONS

"IEEE P802.111n/D1.0 Draft Amendment to Standard [for] Information Technology—Telecommunications and information exchange between systems—Local and Metropolitan networks—Specific requirements-Part 11: Wireless LAN Medium Access Control (MAC) and Physical Layer (PHY) Specifications; Enhancements for Higher Throughput" Mar. 2006, the IEEE, New York, NY, USA; p. i-vii & p. 1-328.

(Continued)

*Primary Examiner* — Timothy Pham
(74) *Attorney, Agent, or Firm* — Shichrur & Co.

(57) ABSTRACT

A wireless communication device, and a wireless communication system and a method of beamforming is presented. The wireless communication system and/or device includes a beamformee unit, a beamformer unit and two or more antennas to transmit the data unit and the protocol data unit according to the beamformee and the beamformer units, respectively. The beamformee conveys feedback information by a data unit in one of the feedback positions that include an immediate feedback position, an aggregated feedback position and a delayed feedback position. The beamformer unit generates a protocol data unit including a control field that includes one of the feedback request information types which is selected from a Channel State Information or uncompressed Steering Matrix or compressed Steering Matrix, to request feedback from a remote communication device.

34 Claims, 5 Drawing Sheets

(56) References Cited

U.S. PATENT DOCUMENTS

| | | | |
|---|---|---|---|
| 6,144,711 | A | 11/2000 | Raleigh et al. |
| 6,778,612 | B1 | 8/2004 | Lozano et al. |
| 7,280,625 | B2 | 10/2007 | Ketchum et al. |
| 7,366,245 | B2 | 4/2008 | Li et al. |
| 7,369,511 | B2 | 5/2008 | Utsunomiya et al. |
| 7,417,974 | B2 | 8/2008 | Hansen |
| 7,486,720 | B2 | 2/2009 | Molisch et al. |
| 7,493,664 | B2 | 2/2009 | Riccobon |
| 7,508,778 | B2 | 3/2009 | Yafuso |
| 7,522,555 | B2 | 4/2009 | Li et al. |
| 7,555,053 | B2 | 6/2009 | Trachewsky et al. |
| 7,564,831 | B2 | 7/2009 | Ihm et al. |
| 7,564,914 | B2 | 7/2009 | Hansen et al. |
| 7,719,993 | B2 | 5/2010 | Li et al. |
| 8,200,164 | B2 | 6/2012 | Trainin et al. |
| 8,243,749 | B2 | 8/2012 | Basson et al. |
| 2004/0165558 | A1* | 8/2004 | Ling et al. .............. 370/334 |
| 2004/0229653 | A1 | 11/2004 | Chotkowski et al. |
| 2005/0037799 | A1 | 2/2005 | Braun et al. |
| 2005/0135295 | A1* | 6/2005 | Walton et al. .............. 370/328 |
| 2006/0094373 | A1 | 5/2006 | Hottinen |
| 2006/0111129 | A1 | 5/2006 | Ihm et al. |
| 2006/0146725 | A1 | 7/2006 | Li et al. |
| 2006/0165008 | A1* | 7/2006 | Li et al. .............. 370/252 |
| 2006/0165191 | A1* | 7/2006 | Lin et al. .............. 375/267 |
| 2006/0291544 | A1 | 12/2006 | Fischer et al. |
| 2007/0002892 | A1* | 1/2007 | Waxman .............. 370/465 |
| 2007/0104129 | A1 | 5/2007 | Yang et al. |
| 2007/0104288 | A1 | 5/2007 | Kim |
| 2008/0005219 | A1 | 1/2008 | Nabar et al. |
| 2009/0086690 | A1* | 4/2009 | Gu et al. .............. 370/338 |

OTHER PUBLICATIONS

Eklund, C. et al. "IEEE Standard 802.16: A Technical Overview of the WirelessMAN Air Interface for Broadband Wireless Access" 2002, the IEEE, New York, NY, USA, p. 98-107.

"IEEE P802.16e/D9 Draft IEEE Standard Local and Metropolitan Area Networks Part 16: Air Interface for fixed and Mobile Broadband Wireless Access Systems, Amendment for Physical and Medium Access Control Layers for Combined Fixed and Mobile Operation in Licensed Bands" Jun. 2005, the IEEE, New York, NY, USA; p. i-xxvi & p. 1-630.

International Search Report and Written Opinion from PCT/US2006/045698, Mailed on Jul. 4, 2007, 20 Pages.

Mathew Gast, "802.11 Wireless Networks: The Definitive Guide, Second Edition" Internet Citation, Apr. 2005, XP002414302, http://www.oreilly.com/catalog/802dot112/ retrieved on Jan. 11, 2007.

Punnoose R J et al. "Communications resources management for advanced telematics applications" Intelligent Transportation Systems, 2001. Proceedings. 2001 IEEE Aug. 25-29, 2001, Piscataway, NJ, USA, IEEE XP010555921, pp. 1056-1060.

3GPP TSG RAN WG1#31, Tdoc R1-03-0286 "Text Proposal on CQI Enhancements for TR on HSDPA Enhancements" Tokyo, Japan, Feb. 18-21, 2003, XP002312853.

Xia P et al. "Multiantenna Adaptive Modulation with Beamforming based on Bandwidth-Constrained Feedback", IEEE Transactions on Communications, vol. 53, No. 3, IEEE Service Center, Piscataway, NJ, US, Mar. 3, 2005, XP001227565; 11 pages.

Non-final Office Action for U.S. Appl. No. 11/645,789 mailed on Jul. 23, 2009.

Final Office Action for U.S. Appl. No. 11/645,789 mailed on Dec. 14, 2009.

Non-final Office Action for U.S. Appl. No. 11/292,909 mailed on Aug. 28, 2009.

Final Office Action for U.S. Appl. No. 11/292,909 mailed on Feb. 23, 2010.

Office Action for U.S. Appl. No. 11/292,909 mailed on Jun. 1, 2010.

Office Action Received for Chinese Patent Application No. 200680039913.8, Mailed on Nov. 12, 2010, 3 pages of Office Action and 2 pages of English Translation.

International Preliminary Report on Patentability Received for PCT application No. PCT/US2006/045698, mailed on Jun. 12, 2008, 13 pages.

Notification of Reason(s) for Refusal for JP P2008-535805 mailed on Feb. 7, 2011, 3 pages of Office Action and 3 pages of English Translation.

Office Action Received for European Patent Application No. 06838583.0, Mailed on Dec. 15, 2008, 3 pages.

Office Action for CN 200680039913.8 Mailed on Jun. 2, 2011; 4 pages of Office Action and 4 pages of English Translation.

Notification of Reason(s) for Refusal for JP P2008-535805 mailed on Jul. 19, 2011, 3 pages of Office Action and 3 pages of English Translation.

Non-final Office Action for U.S. Appl. No. 11/645,789 mailed on Oct. 21, 2011.

Office Action for CN 200680039913.8 Mailed on Sep. 26, 2011.

Office Action for EP 06 838 583.0 mailed on Dec. 7, 2011.

Office Action for Japanese Patent Application P2008-535805 mailed on Apr. 9, 2012.

Office Action received for Japanese Patent Application No. P2011-254472, mailed on Feb. 25, 2013, 14 pages of office action including 7 pages of English translation.

Notification of Reason(s) for Refusal for Japanese Patent Application No. P2008-535805, mailed on Mar. 4, 2013, 17 pages of office action including 8 pages of English translation.

Office Action for Chinese Patent Application No. 200680039913.8; mailed on Jul. 15, 2013; 21 pages, including 12 pages of English translation.

\* cited by examiner

WIRELESS COMMUNICATION SYSTEM, ASSOCIATED METHODS AND DATA STRUCTURES

CROSS REFERENCE TO RELATED APPLICATIONS

This Application is a Continuation of U.S. patent application Ser. No. 11/645,789, filed on Dec. 27, 2006, and entitled "Wireless Communication System, Associated Methods and Data Structures", which is a Continuation-In-Part (CIP) of U.S. patent application Ser. No. 11/292,909, filed on Dec. 1, 2005, and entitled "Wireless Communication System, Associated Methods and Data Structures", the entire disclosures of which are incorporated herein by reference.

BACKGROUND OF THE INVENTION

Embodiments of the invention are generally directed to communication systems and, more particularly, to an apparatus, methods and data structures to exchange channel state information in a wireless communication system.

Performance improvement in wireless communication systems may be achieved if the channel characteristics are known by the transmitter, or source, of a wireless communication signal. Conventional techniques for providing the transmitter with information associated with such channel characteristics suffer many implementation-centric limitations, which limit their practicality. An improved apparatus, methods and associated data structures overcoming at least one of these practical limitations is provided in the disclosure, below.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of a wireless communication system, methods and associated data structures is disclosed herein. More specifically, embodiments of a system, apparatus, methods and associated data structures to enable the request and/or feedback of a channel state information (CSI).

According to one embodiment described more fully below, one or more data structures are introduced, e.g., for use in physical layer (PHY) and/or Media Access Control (MAC) communication messages. For example, according to one embodiment described more fully below, one or more of a feedback request field in a high throughput (HT) control field and/or a CSI feedback QoS data and HTC frame are generally introduced. Moreover, with the support of such data structures, an innovative CSI feedback mechanism that enables the exchange of feedback information in support of at least dynamic link adaptation and/or transmit beamforming is presented.

According to one embodiment, the channel modeling agent (CMA) with a feedback generator is implemented in a communications device which may implement one or more features introduced above, although the invention is not limited in this regard. As developed more fully below, the CMA may be engaged by a host communications device to enable the exchange of CSI with a remote communications device using, e.g., one or more of the innovative data structures introduced above. According to one embodiment, the CMA may be invoked to determine channel state information associated with a wireless communication channel established with at least one other (remote) communications device(s).

According to one embodiment, a communications device may implement a beamformee that includes a feedback generator and the CMA to facilitate the communication of information associated with the determined CSI with at least a subset of the remote one or more communication device(s). According to one embodiment, the innovative data structures introduced above may be employed by the feedback generator to respond or convey information associated with such CSI. The communication device may include a beamformer to initiate and to receive the CSI and other feedback information and may form a beam accordingly.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Technical detail regarding some of the operating characteristics of the mobile devices and/or the wireless communication network(s) in which the CMA may be implemented may be found in, e.g., the IEEE 802.11, 1999 Edition; Information Technology Telecommunications and Information Exchange Between Systems—Local and Metropolitan Area Networks—Specific Requirements, Part 11: WLAN Medium Access Control (MAC) and Physical (PHY) Layer Specifications, its progeny and supplements thereto (e.g., 802.11a, .11g and .11n). See, also, the IEEE Std 802.16-2001 IEEE Std. 802.16-2001 IEEE Standard for Local and Metropolitan area networks Part 16: Air Interface for Fixed Broadband Wireless Access Systems, its progeny and supplements thereto (e.g., 802.16a, .16d, and .16e).

Figure 1:
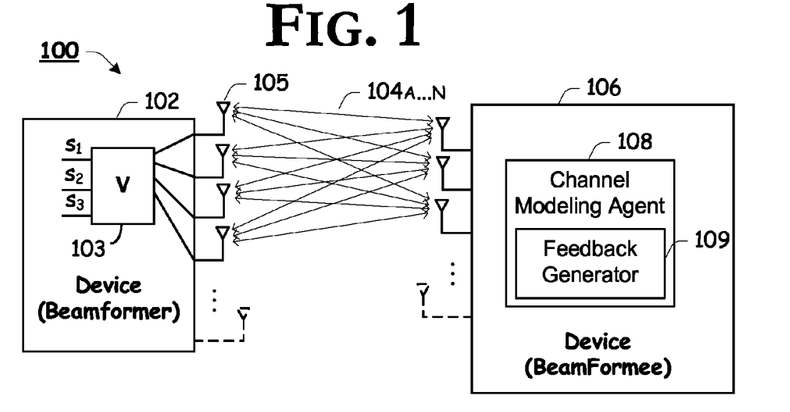
FIG. 1 is a schematic illustration of a block diagram of a wireless communication system according to exemplary embodiments of the invention.

Turning first to FIG. 1, a block diagram of a wireless communication system 100 according to exemplary embodiments of the invention is shown. In accordance with the illustrated example embodiment of FIG. 1, an example communications system 100 is depicted comprising one wireless communications device 102 in communication with another wireless communications device 106 through a wireless communication link 104. As used herein, wireless communication system 100 is intended to represent any of a wide range of wireless communication networks including, but not limited to, a near-field communication (NFC) network, a wireless local area network (WLAN), a wireless metropolitan area network (WMAN), a cellular radiotelephony network, a personal communication system (PCS) network, and the like.

According to one embodiment, wireless communication system 100 may include an 802.11 and/or an 802.16 communication network, where device 102 may be an access point (AP) (or, a base station) while device 106 may be a subscriber station (or, end user device), although the scope of the invention is not limited in this regard. As shown, one or more of device(s) 102, 106 may include multiple transmit and/or receive chains representing a multiple input multiple output (MIMO) communications system.

In a closed-loop MIMO (or, beamforming) system, device 102 may be referred as a beamformer and device 106 may be referred as beamformee, although the scope of the present invention is not limited in this regard. In beamformer (e.g., device 102), a data signal is modified by a beamforming matrix V 103, and then selectively transmitted by a plurality of antennas 105 to a remote receiver. According to one embodiment, the data signal may comprise a number of data streams ($N_1 \ldots N_s$), although the invention is not limited in this regard. The number of data streams may represent the number of spatial channels, with appropriate bit-loading, power weighting and subcarrier assignments, although the invention is not limited in this regard.

According to one embodiment, with four (4) transmit antennas and three (3) data streams (for ease of illustration), the transmitted signal (x) transmitted via the $N_t$ antenna may be represented as:

$$x = V \times s \text{ where} \quad (1)$$

$$V = \begin{bmatrix} v_{11} & v_{12} & v_{13} \\ v_{21} & v_{22} & v_{23} \\ v_{31} & v_{32} & v_{33} \\ v_{41} & v_{42} & v_{43} \end{bmatrix}, \text{ and } s = \begin{bmatrix} s_3 \\ s_2 \\ s_3 \end{bmatrix}$$

As shown, s is an $N_s$-vector of data symbols, and V is the $N_t$ by $N_s$, beamforming matrix developed from information (e.g., matrix codebook(s) and or indices thereto) feedback from a remote receiver. According to one embodiment, the beamforming matrix V is unitary and power/bit loading is applied on vector s, as introduced above.

Device 106 (e.g., beamformee) is depicted comprising a channel modeling agent (CMA) 108 to dynamically generate a model of the wireless communication channel, e.g., by measuring one or more channel characteristics. According to one embodiment, channel state information (C SI) depicting one or more elements of the channel model and/or the channel characteristics may be generated by CMA 108.

According to one embodiment, a feedback generation mechanism (e.g., feedback generator 109) may be invoked to support the communication of the channel state information to other, remote, communication device(s). According to one embodiment described more fully below, the feedback generation mechanism may utilize or more of the data structures introduced above to request, respond and/or convey channel state information, e.g., in support of dynamic link adaptation, beamforming, etc. According to one embodiment, one or more of such data structures may be implemented within the physical layer convergence protocol (PLCP), e.g., within PLCP protocol data unit(s) (PPDU), although the scope of the invention is not limited in this regard.

It will be appreciated that, but for the introduction of the CMA 108 and/or the feedback generator 109, device (e.g., Beamformee) 106 is intended to represent any of a wide variety of electronic device(s) with wireless communication capability. In some embodiments, CMA 108 may well be implemented within a receiver element of a device, e.g., in a baseband and/or applications processor of the receiver. Similarly, the feedback generation mechanism (e.g., feedback generator 109) may be implemented in hardware, software and/or firmware and/or in any combination of hardware, software and/or firmware and the data structures may be invoked in PHY or MAC layer communications, although the scope of the claimed invention is not limited in this regard.

Figure 2:
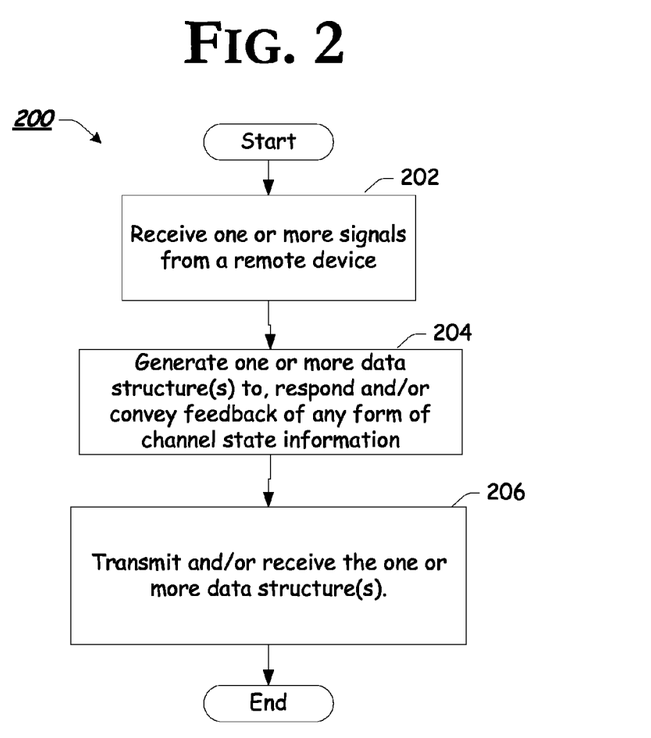
FIG. 2 is a schematic illustration of flow chart of a method for the exchange of channel state information, according to exemplary embodiment of the present invention.

Turning to FIG. 2, a flow chart of a method for the exchange of channel state information (CSI), according to exemplary embodiment of the present invention is shown. Although the scope of the present invention is not limited in this respect, the method begins with block 202 wherein a communications device (e.g., 106) receives one or more communications signal(s) from one or more remote transmitter(s) (e.g., 102).

In block 204, the communications device (e.g., 106) invokes a channel modeling agent (CMA) (e.g., 108) that may measure one or more characteristics of at least a subset of the received signal(s). According to one embodiment, the communications device (e.g., 106) may respond and/or convey channel state information (e.g., associated with the information generated by the CMA 108, and/or equivalent information generated at remote device(s)) from/to one or more remote devices, e.g., utilizing the data structures introduced above.

More particularly, the feedback generator mechanism 109 may utilize one or more of the following data structures in support of the response and/or exchange of channel state information, according to one exemplary embodiment of the present invention.

High Throughput Control (HTC) Field Data Structure

According to one embodiment the CSI/Steering field may be included in MAC Header. According to one embodiment the CSI/Steering field may be included in High Throughput Control (HTC) field and the HTC field data structure may be included in any frame except a non-QoS Data frame. A MAC protocol data unit (MPDU) that contains the HT control field may be referred to as an +HTC frame. An example format CSI/Steering field of 2 bits included in 4-octet HT Control Field is shown in the following table:

TABLE 1

Example HT Control field format

| #Bits | B0-B15 | B20-21 | B22-23 | B25-29 |
|---|---|---|---|---|
|  |  |  | CSI/Steering 2 |  |

A definition of CSI/Steering bits is depicted below by Table 2:

TABLE 2

Example CSI/Steering field format

| Field | Meaning | Definition |
|---|---|---|
| CSI/Steering | Type of feedback | 00—No feedback required<br>01—CSI<br>10—uncompressed Steering Matrix<br>11—compressed Steering Matrix |

CSI Feedback $Q_o$S-null +HTC Frame Data Structure

According to one embodiment, a CSI Feedback frame is introduced. According to one embodiment, the CSI feedback frame may be implemented, for example as a QoS-null with HTC field or as no-Ack subtype of management frame. According to one embodiment, the following table (e.g., Table 3) defines an example acknowledge (Ack) policy in the QoS control field. The Extension of the HTC filed may be set as follows:

TABLE 3

QoS Control Ack Policy for CSI feedback

| Request Mode | Ack policy |
|---|---|
| Solicited (in the same TxOP of request) | No Ack |
| Unsolicited (separate access) | Normal Ack |

According to embodiment of the present invention, this frame allows submitting of the feedback as part of aggregation or as an immediate feedback. While transmitting this frame no acknowledgement may be required. With embodiments of the invention, a special subtype of no-Ack may be used in the frame type of management for managing the CSI feedback, if desired. Table 4 depicts at least a portion of an exemplary no-ACK frame.

TABLE 4

Ack Policy for CSI feedback

| Type value b3 b2 | Type description | Subtype value b7 b6 b5 b4 | Subtype description |
|---|---|---|---|
| 00 | Management | 1110 | Action no-ACK |

According to one exemplary embodiment of the present invention, the format of the frame body may be derived from the management action frame. According to one example implementation, the CSI Feedback frame may be of category Transmit Beamforming.

Table 5 depicts orders which may be utilized by a Beamformee to control a beamforming by the CSI feedback, if desired.

TABLE 5

CSI Feedback

| Order | Information | Name | Size | Value |
|---|---|---|---|---|
| 1 | Category | TxBF | 1 | 6 |
| 2 | Action | CSI Feedback | 1 | 2 |
| 3 | Transmit Beamforming Control that includes minimal grouping | Transmit Beamforming Control | 2 |  |
| 4 | Vector Quantized CSI Feedback Information | Vector Quantized Explicit Feedback Information | Variable |  |

According to embodiments of the present invention, the beamformee may use one or more grouping methods to group adjacent subcarriers in order to reduce the wireless communication network overhead, if desired. According to an exemplary embodiment of the invention, the Beamformee may use a grouping method to reduce the size of the CSI Matrices Report, for example the size of the CSI Matrices Report may be $Nr \times 8 + Ns \times (3 + 2 \times Nb \times Nc \times Nr)$ bits, where the number of subcarriers sent Ns is a function of Ng. Table 8 is an example of deferent grouping method of grouping base on a band wide of the transmission.

TABLE 6

Grouping

| BW and Grouping | Ns | Carriers for which matrices are sent |
|---|---|---|
| 20 MHz<br>Ng = 1 | 56 | All data and pilot carriers:<br>−28, −27, . . . −2, −1, 1, 2, . . . 27, 28 |
| 20 MHz<br>Ng = 2 | 30 | −28, −26, −24, −22, −20, −18, −16, −14,<br>−12, −10, −8, −6, −4, −2, −1, 1, 3, 5, 7, 9,<br>11, 13, 15, 17, 19, 21, 23, 25, 27, 28 |
| 20 MHz<br>Ng = 4 | 16 | −28, −24, −20, −16, −12, −8, −4, −1,<br>1, 5, 9, 13, 17, 21, 25, 28 |

According to this exemplary embodiment of the invention, a first communications device (e.g., Beamformer) requests and uses the CSI feedback for transmit beamforming. The frame exchange may also accommodate computation of the steering vectors at the Initiator of the communication. In this case, instead of sending back steering vectors, the responding communication device(s) (e.g., Beamformee) may return quantized channel estimates to the initiating Beamformer, and the Beamformer will compute the steering vectors, although the invention is not limited in this regard. As in the last case the quantized channel estimates may be used for Modulation Coding Schemes (MCS) optimization out of transmit beamforming. According to one example implementation, the type of information returned to CSI feedback requestor is subject of advertised capabilities.

Beamformee Response Capabilities

According to embodiments of the present invention, the Beamformee may response to the Beamformer request(s) according to the Beamformee capabilities. The Beamformee capabilities may depict in table 8 and may include the flowing capabilities: immediate feedback which includes an immediate feedback in a default communication mode and an immediate feedback in an aggregate communication mode. Table 7 depicts the Beamformee feedback capabilities.

TABLE 7

Beamformee feedback capabilities

| B11 B12 | B13 B14 | B15 B16 | B17 B18 | B19 B31 |
|---------|---------|---------|---------|---------|
| Explicit TxBF CSI feedback | Explicit uncompressed Steering Matrix feedback | Explicit compressed Steering Matrix feedback | Minimal grouping | |

TABLE 8

Beamformee feedback capabilities description

| TxBF Capability field | Definition | Encoding |
|---|---|---|
| Explicit BF CSI feedback | Indicates whether or not this receiver can return CSI explicit feedback. | Set to 00 if not supported<br>01 indicates delayed feedback<br>10 indicates immediate feedback<br>11 indicates delayed and immediate feedback |
| Explicit non-compressed Steering Matrix feedback | Indicates whether or not this receiver can return non-compressed Steering Matrix explicit feedback. | Set to 00 if not supported<br>01 indicates delayed feedback<br>10 indicates immediate feedback<br>11 indicates delayed and immediate feedback |
| Explicit compressed Steering Matrix feedback | Indicates whether or not this STA can apply transmit beamforming using explicit compressed Steering Matrix feedback. | Set to 00 if not supported<br>01 indicates delayed feedback<br>10 indicates immediate feedback<br>11 indicates delayed and immediate feedback |
| Minimal grouping | Minimal grouping used for explicit feeback report | Set to 00 if support groups of 1 (no grouping)<br>01 indicates groups of 1, 2<br>10 indicates groups of 1, 4<br>11 indicates groups of 1, 2, 4 |

Beamformee Feedback Response Timing

Figure 3:
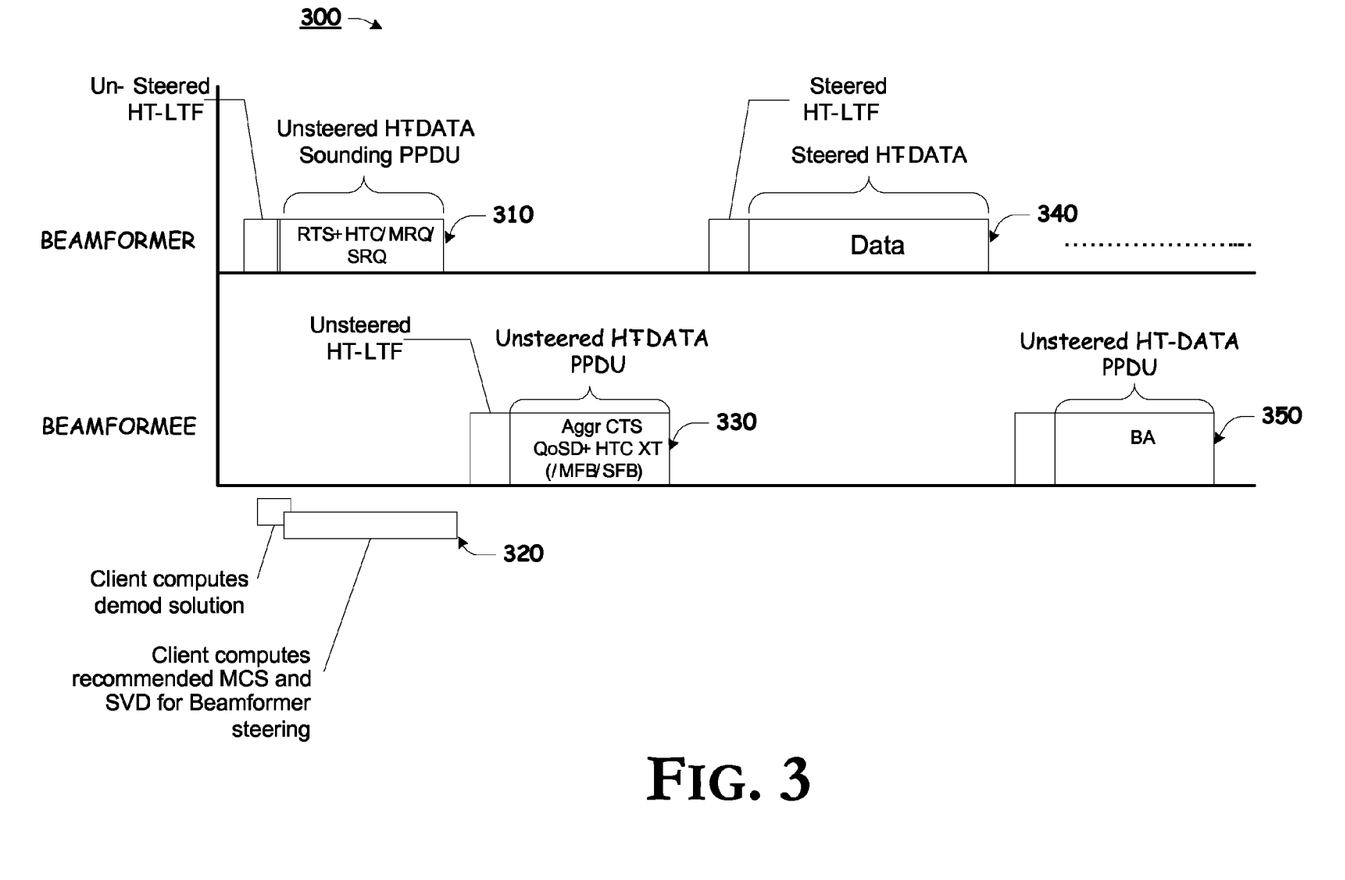
FIG. 3 is a schematic illustration of a time diagram to provide a graphical representations of an aggregated communications exchange in accordance with one exemplary embodiment of the invention.
Figure 4:
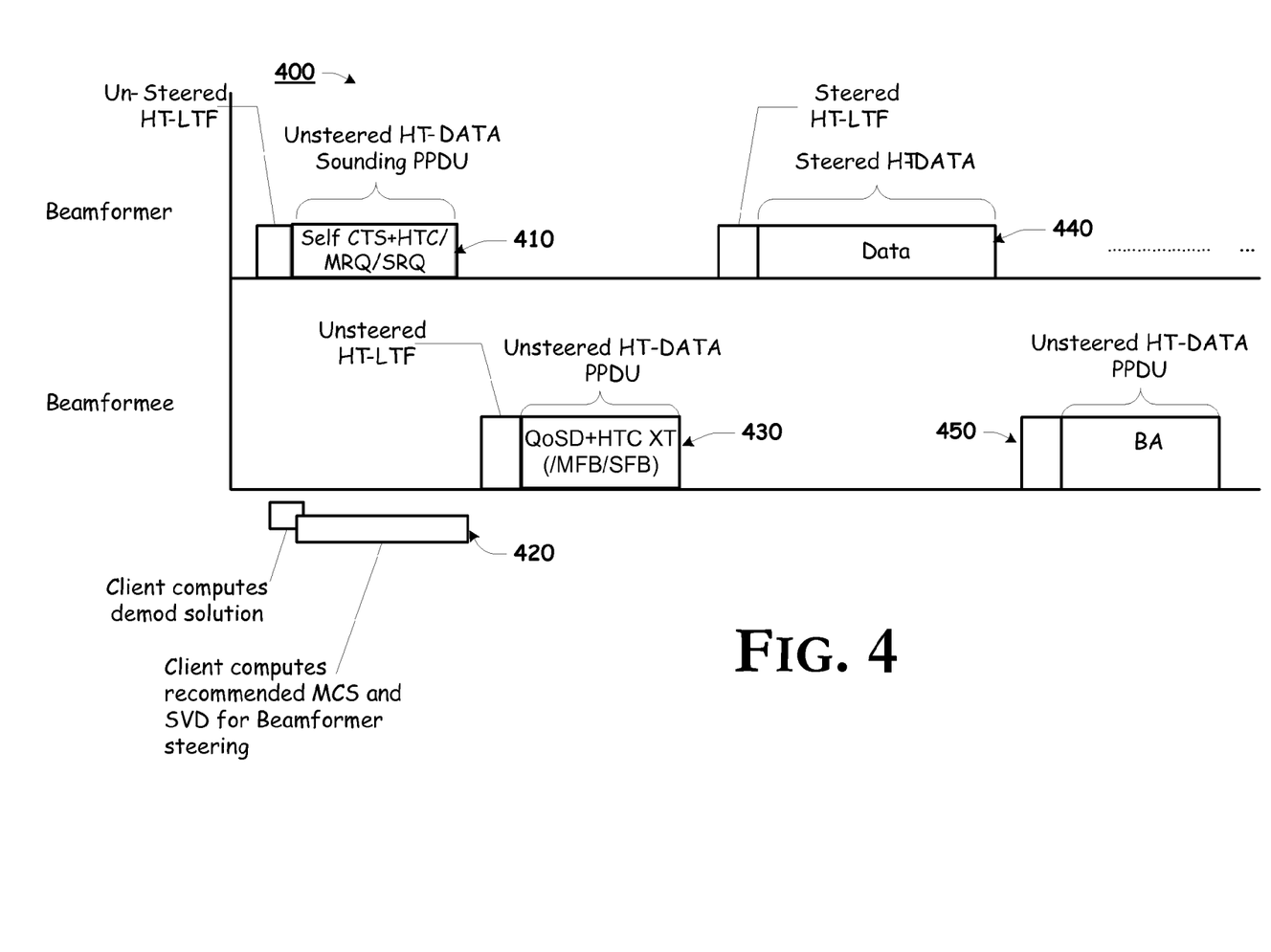
FIG. 4 is a schematic illustration of a time diagram to provide graphical representations of an immediate communications in accordance with one exemplary embodiment of the invention.
Figure 5:
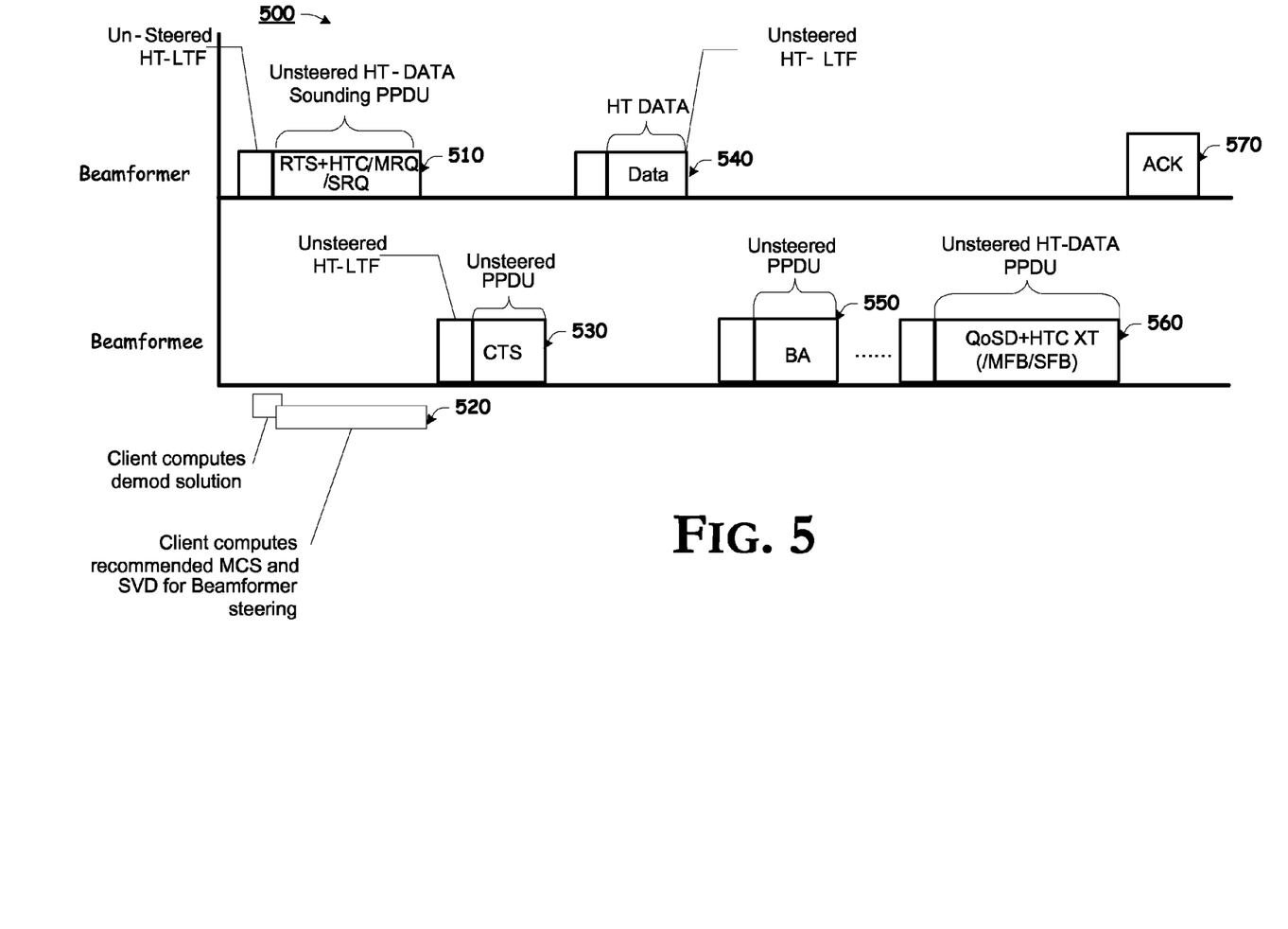
FIG. 5 is a schematic illustration of a time diagram to provide graphical representations of a delayed communications in accordance with one exemplary embodiment of the invention.

Detailed description of exchanging communication according to Beamformee response capabilities will be present in FIGS. 3, 4 and 5.

According to one embodiment, the CSI feedback mechanism introduced herein enables the exchange of explicit feedback for Link Adaptation as well for Transmit beamforming. One example of the basic frame exchange is depicted in FIG. 3, although the scope of the invention is not limited in this regard.

Turning to FIG. 3, a schematic illustration of a time diagram to provide graphical representations of an aggregated communications exchange in accordance with one exemplary embodiment of the invention is shown. According to some exemplary embodiments of the invention CSI feedback information may be immediately aggregated with the MAC response (e.g., CTS, ACK, BA and the like).

For example, the communication sequence may include:
1. The sequence is initiated by a Beamformer which sends an unsteered HT-DATA sounding PPDU 310 containing a request to send (RTS), Modulation and Coding Scheme Request (MRQ) and a CSI Feedback Request (SRQ);
2. The responding client (e.g., Beamformee) uses the sounding packet to make a channel estimate, and computes the singular value decomposition (SVD) and Modulation and Coding Scheme (MCS) of the channel 320;
3. The resulting steering vectors are quantized and returned to the Beamformer in an unsteered HT-DATA PPDU containing an aggregated clear to send (CTS), an MCS feedback (MFB) and a steering feedback (SFB) message 330;
4. The Beamformer uses the result to transmit a steered PPDU to the Beamformee 340. If the Beamformer has subsequent PPDUs to send in steered mode, this PPDU should also be a sounding PPDU; and
5. The Beamformee may respond with an unsteered HT_DATA PPDU including block acknowledge (BA) 350

Actions 4 and 5 may be repeated for an ongoing beamforming exchange. If latencies cause the channel estimates or steering vectors to get stale, then actions one to three need to be repeated.

Turning to FIG. 4, a schematic illustration of a time diagram to provide graphical representations of an immediate communications in accordance with one exemplary embodiment of the invention is shown. According to this exemplary embodiment of the invention, the beamformee may send feedback response information immediately ((e.g., in a system predefined time) after the reception of a sounding PPDU. If the Beamformee may not transmit the immediate CSI/Steering response information immediately (e.g., in a system predefined time after the end of the received sounding packet), the Beamformee may transmit the feedback response information in an aggregate with an ACK or BA in the same TxOP.

For example, the communication sequence according this exemplary embodiment may include:
1. The sequence is initiated by a Beamformer which sends an unsteered HT-DATA sounding PPDU 410 containing a clear to send to self (CTS to self), MRQ and SRQ;
2. The responding client (e.g., Beamformee) uses the sounding packet to make a channel estimate, and computes the SVD and MFB of the channel 420;
3. The resulting steering vectors are quantized and returned to the Beamformer in a PPDU containing an MFB and a steering feedback (SFB) message 430;
4. The Beamformer uses the result to transmit a steered PPDU to the Beamformee 440. If the Beamformer has subsequent PPDUs to send in steered mode, this PPDU may also be a sounding PPDU, if desired; and
5. The Beamformee may respond with an unsteered HT_DATA PPDU including block acknowledge (BA) 450

Actions 4, and 5 may be repeated for an ongoing beamforming exchange. If latencies cause the channel estimates or steering vectors to get stale, then actions one to three need to be repeated Turning to FIG. 5, a schematic illustration of a time diagram to provide graphical representations of a delayed communications in accordance with one exemplary embodiment of the invention is shown. According to this exemplary embodiment of the invention, the beamformee may send delayed feedback response information according the Beamformee response timing capabilities.

For example, the communication sequence according this exemplary embodiment may include:
1. The sequence is initiated by a Beamformer which sends an unsteered HT-DATA sounding PPDU 510 containing a RTS, MRQ and SRQ;
2. The responding client (e.g., Beamformee) uses the sounding packet to make a channel estimate, and computes the SVD and MFB of the channel 520;
3. The resulting steering vectors are quantized in 520;

4. The responding client (e.g., Beamformee) returns to the Beamformer an Unsteered PPDU containing a CTS 530;
5. The Beamformer continues to transmit an unsteered PPDU 540 including data to the Beamformee;
6. The Beamformee may respond with an unsteered HT_DATA PPDU including BA 550;
7. The Beamformee may transmit a PPDU containing an MFB and a steering feedback (SFB) message 560 after getting link access rights on its own, if desired; and
8. The Beamformer may response with ACK 570.
9. The Beamformer may use the gotten MFB and SFB to steer the following transmissions of the HT_DATA PPDUs to the Beamformee (not seen in the figure)

Alternate Embodiment(s)

Figure 6:
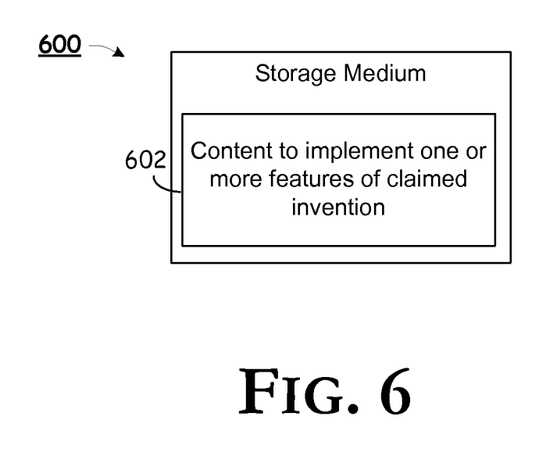
FIG. 6 is a schematic illustration of a block diagram of an example article of manufacture including content which, when executed by an accessing machine, causes the machine to implement one or more aspects of embodiment(s) of the invention.

Turning to FIG. 6, a schematic illustration of a block diagram of an example article of manufacture including content which, when executed by an accessing machine, causes the machine to implement one or more aspects of embodiment(s) of the invention is shown. According to this exemplary embodiment of the invention, a storage medium 400 includes content which, when invoked, may cause an accessing machine to implement one or more aspects of the channel modeling agent 108, feedback generator mechanism 109, associated data structures and/or associated methods 200. In this regard, storage medium 600 may include content 602 (e.g., instructions, data structures, or any combination thereof) which, when executed, causes an accessing device to implement one or more aspects of that introduced above.

The machine-readable (storage) medium 600 may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

Moreover, the present invention may also be downloaded as a computer program product, wherein the program may be transferred from a remote computer to a requesting computer by way of data signals embodied in a tangible carrier wave or other propagation medium via a communication link (e.g., a modem, radio or network connection). As used herein, all of such media is broadly considered storage media.

It should be understood that embodiments of the present invention may be used in a variety of applications. Although the present invention is not limited in this respect, the circuits disclosed herein may be used in many apparatuses such as in the transmitters and receivers of a radio system. Radio systems intended to be included within the scope of the present invention include, by way of example only, wireless local area networks (WLAN) devices and wireless wide area network (WWAN) devices including wireless network interface devices and network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), sensor networks, personal area networks (PANs) and the like, although the scope of the invention is not limited in this respect. Such devices may well be employed within any of a variety of Embodiments of the present invention may also be included in integrated circuit blocks referred to as core memory, cache memory, or other types of memory that store electronic instructions to be executed by the microprocessor or store data that may be used in arithmetic operations. In general, an embodiment using multistage domino logic in accordance with the claimed subject matter may provide a benefit to microprocessors, and in particular, may be incorporated into an address decoder for a memory device. Note that the embodiments may be integrated into radio systems or hand-held portable devices, especially when devices depend on reduced power consumption. Thus, laptop computers, cellular radiotelephone communication systems, two-way radio communication systems, one-way pagers, two-way pagers, personal communication systems (PCS), personal digital assistants (PDA's), cameras and other products are intended to be included within the scope of the present invention.

Certain aspects or embodiments of the present invention may include various operations and/or data structures. The operations of the present invention may be performed by hardware components, or may be embodied in machine-executable content (e.g., instructions), which may be used to cause a general-purpose or special-purpose processor or logic circuits programmed with the instructions to perform the operations. Alternatively, the operations may be performed by a combination of hardware and software. Moreover, although the invention has been described in the context of a computing appliance, those skilled in the art will appreciate that such functionality may well be embodied in any of number of alternate embodiments such as, for example, integrated within a communication appliance (e.g., a cellular telephone).

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Any numbers of variations of the inventive concept are anticipated within the scope and spirit of the present invention. In this regard, the particular illustrated example embodiments are not provided to limit the invention but merely to illustrate it. Thus, the scope of the present invention is not to be determined by the specific examples provided above but only by the plain language of the following claims.

It should be appreciated that according to some embodiments of the present invention, the method described below, may be implemented in machine-executable instructions. These instructions may be used to cause a general-purpose or special-purpose processor that is programmed with the instructions to perform the operations described. Alternatively, the operations may be performed by specific hardware that may contain hardwired logic for performing the operations, or by any combination of programmed computer components and custom hardware components.

The method may be provided as a computer program product that may include a machine-readable medium having stored thereon instructions that may be used to program a computer (or other electronic devices) to perform the method. For the purposes of this specification, the terms "machine-readable medium" may include any medium that is capable of storing or encoding a sequence of instructions for execution by the machine and that cause the machine to perform any one of the methodologies of the present invention. The term "machine-readable medium may accordingly include, but not limited to, solid-state memories, optical and magnetic disks, and a carrier wave that encodes a data signal.

Although the scope of the present invention is not limited in this respect, the system and method disclosed herein may be implemented in many wireless, handheld and portable communication devices. By way of example, wireless, handheld and portable communication devices may include wireless and cellular telephones, smart telephones, personal digital assistants (PDAs), web-tablets and any device that may provide wireless access to a network such, an intranet or the internet. It should be understood that the present invention may be used in a variety of applications.

What is claimed is:

1. A wireless communication device comprising:
a beamformee to control beamforming by a feedback response, wherein the feedback response is selected from an immediate feedback and a delayed feedback, and the feedback response is to provide feedback capabilities information by a data unit which includes a beamforming capabilities field including an explicit Beam Form (BF) channel state information (CSI) feedback field to indicate whether said beamformee is capable of returning CSI explicit feedback, an explicit non compressed steering matrix feedback field to indicate whether said beamformee is capable of returning noncompressed beamforming feedback matrix explicit feedback, an explicit compressed steering matrix feedback field, and a minimal grouping field to indicate grouping of subcarriers to be used for an explicit feedback report.

2. The wireless communication device according to claim 1, wherein the selection of at least one of the immediate feedback and the delayed feedback is provided in the data unit.

3. The wireless communication device according to claim 2, wherein the explicit BF CSI feedback field, the explicit uncompressed steering matrix feedback field and the explicit compressed steering matrix feedback field are included in a High Throughput Control (HTC) field within the data unit.

4. The wireless communication device according to claim 1, wherein the beamformee comprises:
a feedback generator to send the feedback response, wherein the feedback response is selected from a CSI feedback, an uncompressed feedback and a compressed feedback.

5. The wireless communication device according to claim 4, wherein the beamformee is able to send compressed feedback matrices to a beamformer.

6. The wireless communication device according to claim 4, wherein the beamformee is able to send uncompressed feedback matrices to a beamformer.

7. The wireless communication device according to claim 1, wherein the beamformee is configured to group adjacent subcarriers to reduce a wireless communication network overhead according to the minimal grouping.

8. A wireless communication device comprising:
a beamformer to control beamforming according to capabilities information received with a feedback response from a beamformee, wherein the feedback response is selected from an immediate feedback and a delayed feedback, and the capabilities information is to be provided by a data unit which includes a beamforming capabilities field including an explicit Beam Form (BF) channel state information (CSI) feedback field to indicate whether said beamformee is capable of returning CSI explicit feedback, an explicit non compressed steering matrix feedback field to indicate whether said beamformee is capable of returning noncompressed beamforming feedback matrix explicit feedback, an explicit compressed steering matrix feedback field, and a minimal grouping field to indicate grouping of subcarriers to be used for an explicit feedback report.

9. The wireless communication device according to claim 8, wherein selection of at least one of the immediate feedback and the delayed feedback is advertised in the data unit.

10. The wireless communication device according to claim 9, wherein the explicit BF CSI feedback field, the explicit uncompressed steering matrix feedback field and the explicit compressed steering matrix feedback field are advertised in a High Throughput Control (HTC) field within the data unit.

11. The wireless communication device according to claim 8, wherein the feedback response is selected from a CSI feedback an uncompressed feedback and a compressed feedback.

12. The wireless communication device according to claim 8, wherein the beamformer is able to receive compressed feedback matrices.

13. The wireless communication device according to claim 8, wherein the beamformer is able to receive uncompressed feedback matrices.

14. A wireless communication system comprising:
a beamformee to control beamforming by a feedback response, wherein the feedback response is selected from an immediate feedback and a delayed feedback, and the feedback response is to provide feedback capabilities information by a data unit which includes a beamforming capabilities field including an explicit Beam Form (BF) channel state information (CSI) feedback field to indicate whether said beamformee is capable of returning CSI explicit feedback, an explicit non compressed steering matrix feedback field to indicate whether said beamformee is capable of returning noncompressed beamforming feedback matrix explicit feedback, an explicit compressed steering matrix feedback field, and a minimal grouping field to indicate grouping of subcarriers to be used for an explicit feedback report; and
two or more antennas operably coupled to the beamformee to transmit the feedback response.

15. The wireless communication system of claim 14, wherein selection of at least one of the immediate feedback and the delayed feedback is advertised in the data unit.

16. The wireless communication system of claim 15, wherein the explicit BF CSI feedback field, the explicit uncompressed steering matrix feedback field and the explicit compressed steering matrix feedback field are advertised in a High Throughput Control (HTC) field within the data unit.

17. The wireless communication system of claim 14, wherein the beamformee comprises:
a feedback generator to send the feedback response to a beamformer, wherein the feedback response is selected from a CSI feedback, an uncompressed feedback and a compressed feedback.

18. The wireless communication system of claim 14, wherein the beamformee is able to send compressed feedback matrices.

19. The wireless communication system of claim 14, wherein the beamformee is able to send uncompressed feedback matrices.

20. The wireless communication system of claim 14, wherein the beamformee is configured to group adjacent subcarriers to reduce a wireless communication network overhead.

21. A method of explicit feedback beamforming comprising:
controlling beamforming by providing feedback information according to feedback capabilities information provided by a feedback response from a beamformee, wherein the feedback response is selected from an immediate feedback and a delayed feedback, and the feedback capabilities information is provided by a data unit which includes a beamforming capabilities field including an explicit Beam Form (BF) channel state information (CSI) feedback field to indicate whether said beamformee is capable of returning CSI explicit feedback, an explicit non compressed steering matrix feedback field to indicate whether said beamformee is capable of returning noncompressed beamforming feedback matrix explicit feedback, an explicit compressed steering matrix feedback field, and a minimal grouping field to indicate grouping of subcarriers to be used for an explicit feedback report.

22. The method of claim 21, wherein selection of at least one of the immediate feedback and the delayed feedback is advertised in the data unit.

23. The method of claim 22, comprising:
sending the feedback response to a beamformer, wherein the explicit BF CSI feedback field, the explicit uncompressed steering matrix feedback field and the explicit compressed steering matrix feedback field are in a High Throughput Control (HTC) field within the data unit.

24. The method of claim 21 comprising:
sending the feedback response to a beamformer, wherein the feedback response is selected from a CSI feedback, an uncompressed feedback and a compressed feedback.

25. The method of claim 21 comprising:
sending compressed feedback matrices to a beamformer.

26. The method of claim 21 comprising:
sending uncompressed feedback matrices to a beamformer.

27. The method of claim 21 comprising:
grouping adjacent subcarriers to reduce a wireless communication network overhead.

28. A non-transitory product including a storage medium having stored thereon instructions that, when executed by a machine, result in:
controlling beamforming according to feedback capabilities information provided by a feedback response from a beamformee, wherein the feedback response is selected from an immediate feedback and a delayed feedback, and the feedback capabilities information is provided by a data unit which includes a beamforming capabilities field including an explicit Beam Form (BF) channel state information (CSI) feedback field to indicate whether said beamformee is capable of returning CSI explicit feedback, an explicit non compressed steering matrix feedback field to indicate whether said beamformee is capable of returning noncompressed beamforming feedback matrix explicit feedback, an explicit compressed steering matrix feedback field, and a minimal grouping field to indicate grouping of subcarriers to be used for an explicit feedback report.

29. The product of claim 28, wherein selection of at least one of the immediate feedback and the delayed feedback is advertised in the data unit.

30. The product of claim 28, wherein the instructions, when executed, result in:
sending the feedback response to a beamformer, wherein the feedback response is selected from a CSI feedback, an uncompressed feedback and a compressed feedback.

31. The product of claim 28, wherein the instructions, when executed, result in:
sending the feedback response to a beamformer, wherein the explicit BF CSI feedback field, the explicit uncompressed steering matrix feedback field and the explicit compressed steering matrix feedback field are in a High Throughput Control (HTC) field within a data unit.

32. The product of claim 28, wherein the instructions, when executed, result in:
sending compressed feedback matrices to a beamformer.

33. The product of claim 28, wherein the instructions, when executed, result in:
sending uncompressed feedback matrices to a beamformer.

34. The product of claim 28, wherein the instructions, when executed, result in:
grouping adjacent subcarriers to reduce a wireless communication network overhead.

* * * * *

UNITED STATES PATENT AND TRADEMARK OFFICE
CERTIFICATE OF CORRECTION

| | | |
|---|---|---|
| PATENT NO. | : 8,711,779 B2 | Page 1 of 1 |
| APPLICATION NO. | : 13/535768 | |
| DATED | : April 29, 2014 | |
| INVENTOR(S) | : Gal Basson et al. | |

It is certified that error appears in the above-identified patent and that said Letters Patent is hereby corrected as shown below:

On the title page, in item (56), in column 2, under "Other Publications", line 1, delete "P802.111n/D1.0" and insert -- P802.11n/D1.0 --, therefor.

Signed and Sealed this
Fourteenth Day of October, 2014

Michelle K. Lee
*Deputy Director of the United States Patent and Trademark Office*